United States Patent
Radziwonczyk-Syta et al.

(10) Patent No.: US 9,805,389 B2
(45) Date of Patent: Oct. 31, 2017

(54) SYSTEMS AND METHODS FOR NEAR REAL-TIME MERGING OF MULTIPLE STREAMS OF DATA

(71) Applicant: Facebook, Inc., Menlo Park, CA (US)

(72) Inventors: Adam Marek Radziwonczyk-Syta, Menlo Park, CA (US); Ajoy Joseph Frank, San Francisco, CA (US); Yingsheng Gao, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 694 days.

(21) Appl. No.: 14/153,858

(22) Filed: Jan. 13, 2014

(65) Prior Publication Data

US 2015/0199712 A1   Jul. 16, 2015

(51) Int. Cl.
   *G06Q 30/00*   (2012.01)
   *G06Q 30/02*   (2012.01)
   *H04L 29/06*   (2006.01)

(52) U.S. Cl.
   CPC ......... *G06Q 30/0246* (2013.01); *H04L 65/60* (2013.01)

(58) Field of Classification Search
   CPC ............................. G06Q 30/02; G06F 15/00
   USPC ........................................................ 705/14
   See application file for complete search history.

(56) References Cited

U.S. PATENT DOCUMENTS

| | | | |
|---|---|---|---|
| 7,506,047 B2* | 3/2009 | Wiles, Jr. ............ | G06F 11/3414 707/999.001 |
| 2006/0136298 A1* | 6/2006 | Klein ..................... | G06Q 30/02 705/14.54 |
| 2008/0183574 A1* | 7/2008 | Nash .................. | G06F 17/30864 705/14.54 |
| 2008/0249870 A1* | 10/2008 | Angell ................... | G06Q 30/02 705/14.53 |
| 2011/0125593 A1* | 5/2011 | Wright ................... | G06Q 30/02 705/14.73 |
| 2011/0231240 A1* | 9/2011 | Schoen .............. | G06Q 30/0242 705/14.41 |
| 2012/0173752 A1* | 7/2012 | Erskins ................. | G06Q 10/06 709/231 |
| 2013/0218943 A1* | 8/2013 | Kawai ............... | H04L 29/08135 709/201 |
| 2013/0325915 A1* | 12/2013 | Ukai ................. | G06F 17/30194 707/827 |

* cited by examiner

*Primary Examiner* — Vincent Cao
(74) *Attorney, Agent, or Firm* — Perkins Coie LLP

(57) ABSTRACT

Systems and methods for performing near real-time merging of distributed data streams are described. For example, streams of ad impressions, ad clicks, and conversions are sorted by user id into virtual buckets. The buckets of data are distributed across multiple servers, so that each server can process their respective buckets of data independently. Each server uses synchronization logic to determine a running delay distribution of the data streams. Based on the delay distributions, merge processing of the streams is appropriately delayed to ensure that the ad impression and ad click stream information needed for correlating with the conversion stream information is likely to be available in real time.

17 Claims, 11 Drawing Sheets

SYSTEMS AND METHODS FOR NEAR REAL-TIME MERGING OF MULTIPLE STREAMS OF DATA

BACKGROUND

For a large social networking service that has millions, or in one case, billions of users, it is advantageous for marketers to present ads on webpages of the service to the users of the service. Additionally, when marketers pay for ads, it is desirable to be able to measure their return on investment by tracking and analyzing user actions associated with posted ads. Conversion tracking can be performed to determine which user actions, such as liking a page or sharing a post in the social networking website, redeeming a coupon, and buying a product, are associated with particular ads posted on webpages of the networking service.

BRIEF DESCRIPTION OF THE DRAWINGS

Examples of methods and systems for performing near real-time attribution processing are illustrated in the figures. One or more embodiments of the present disclosure are illustrated by way of example and not limitation in the figures of the accompanying drawings.

DETAILED DESCRIPTION

Systems and methods for performing real-time or near real-time joining of distributed data streams are described, where near real-time means that data streams can typically be joined within about a minute of receiving a conversion event, and generally, be joined no longer than five minutes after receiving a conversion event. For example, streams of ad impressions, ad clicks, and conversions are sorted by user id into virtual buckets. The buckets of data are distributed across multiple servers, so that each server can process their respective buckets of data independently. Each server uses synchronization logic to determine a running delay distribution of the data streams. Based on the delay distributions, merge processing of the streams is appropriately delayed to ensure that the ad impression and ad click stream information needed for correlating with the conversion stream information is likely to be available in real time.

Various aspects and examples of the embodiments will now be described. The following description provides specific details for a thorough understanding and enabling description of these examples. One skilled in the art will understand, however, that the embodiments may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

General Description

Figure 1:
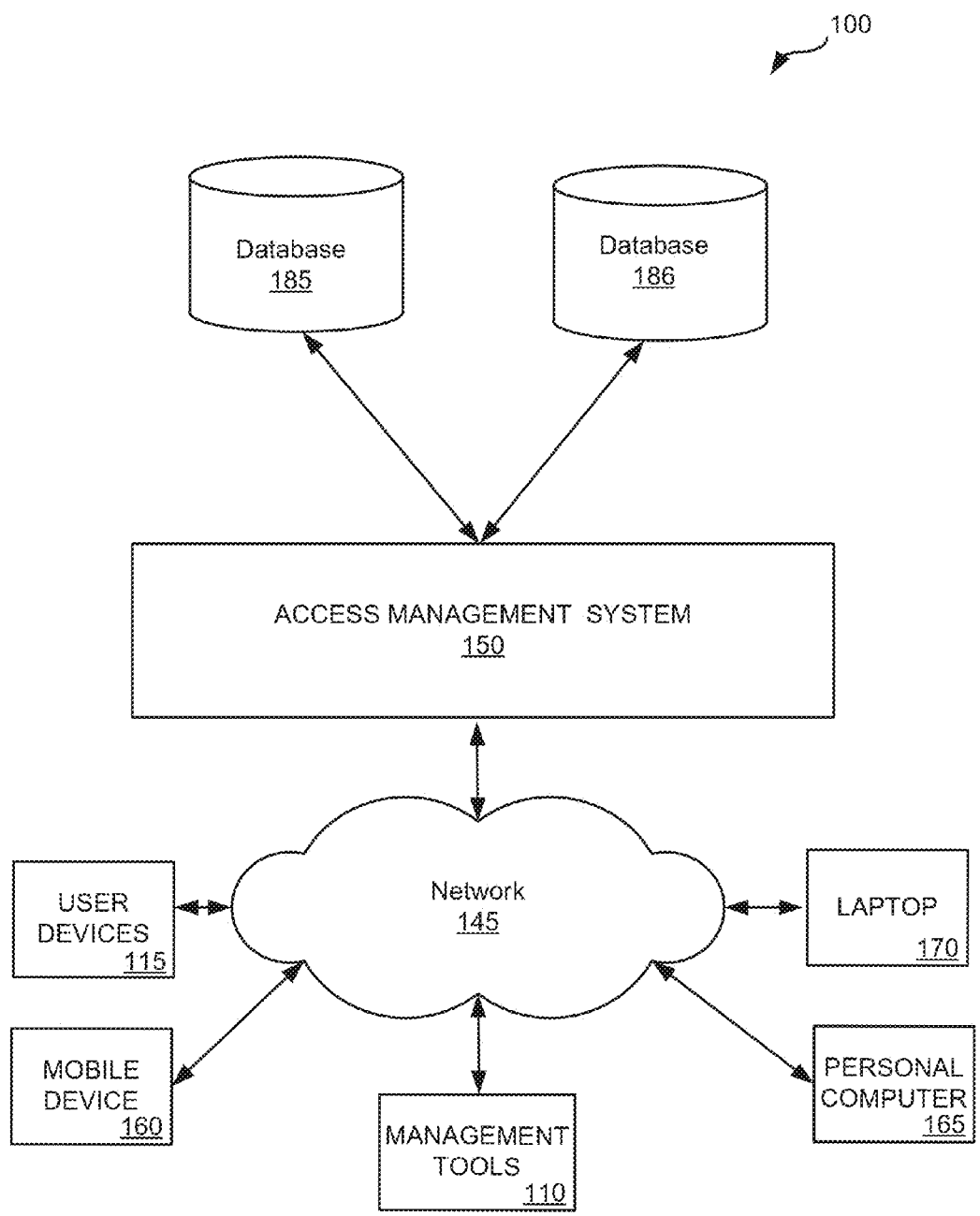
FIG. 1 depicts an example of a networked-based environment in which some embodiments may be used.

FIG. 1 illustrates an example of a networked-based environment 100 in which some embodiments may be utilized. Companies can store a tremendous amount of data (e.g., photographs, messages, e-mails, electronic documents, or healthcare records) and related analytics (e.g., usage analytics). The data can be submitted through various management tools 110, user devices 115, mobile devices 160, personal computers 165, laptops 170, and/or other devices to allow the data to be stored on one or more databases 185 and 186. As illustrated in FIG. 1, these devices and tools may use network 145 to submit and retrieve information from the databases 185 and 186. Various embodiments use access management system 150 to manage the access that the users (both end-users and employees) have to the information and data stored in databases 185 and 186.

User device 115 can be any computing device capable of receiving user input as well as transmitting and/or receiving data via the network 145. In some embodiments, user device 115 is a conventional computer system, such as a desktop 165 or laptop computer 170. In another embodiment, user device 115 may be mobile device 160 having computer functionality, such as a personal digital assistant (PDA), mobile telephone, smart-phone or similar device. User device 115 is configured to communicate with access management system 150 via the network 145. In some embodiments, user device 115 executes an application allowing a user of user device 115 to interact with the access management system 150. For example, user device 115 can execute a browser application to enable interaction between the user device 115 and access management system 150 via the network 145. In some embodiments, user device 115 interacts with access management system 150 through an application programming interface (API) that runs on the native operating system of the user device 115, such as iOS® or ANDROID™.

User devices 115 can be configured to communicate via the network 145, which may comprise any combination of local area and/or wide area networks, using wired and/or wireless communication systems. In some embodiments, network 145 uses standard communications technologies and/or protocols. Thus, network 145 may include links using technologies such as Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 145 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

Streams of Data

For a large social networking service, with billions of users (for example), billions of ads can be served to users accessing the service per day, and hundreds of millions of user actions, such as ad clicks, are performed every day that can be correlated with served ads. Standard attribution time windows used in the industry are one, seven, and 28 days. For the longest attribution window of 28 days for this example, trillions of ad impressions and billions of ad clicks need to be correlated with conversions to provide advertisers with conversion tracking data. Techniques are described below that permit conversion tracking to be performed on these vast amounts of data in near real-time. While streams of data of any type can be joined using the techniques described in this disclosure, for clarity, streams of data specifically used for ad conversion tracking will be described, specifically, ad impressions, ad clicks, and conversions.

Figure 2A:
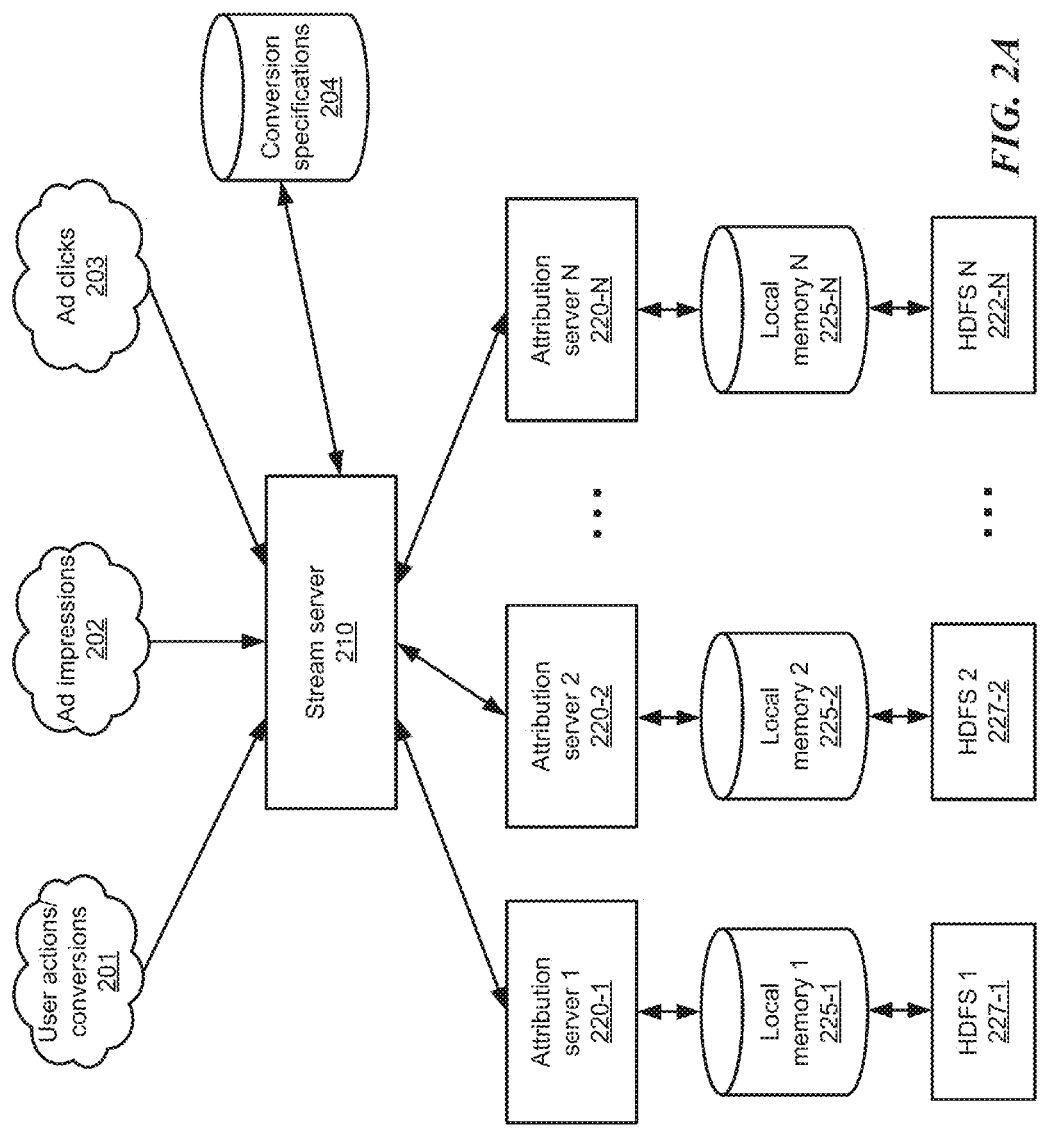
FIG. 2A depicts a block diagram of an example environment in which a stream server and attribution servers are implemented.

In some embodiments, the access management system 150 can include a stream server 210 and several attribution servers 220-1, 220-2, . . . 220-N, as shown in the block diagram of FIG. 2A. The stream server 210 receives a stream of ad impressions 202 delivered to user devices 115, mobile devices 160, laptops 170, and personal computers 165; a stream of ad clicks 203 that are performed by a user in response to delivered ads from user devices 115, mobile devices 160, laptops 170, and personal computers 165; and a stream of user actions or conversions 201 received from partner vendors and internally within the social networking system. In some embodiments, the stream server 210 can be one or more clusters of stream server machines, or even one or more distributed clusters of server machines. In some embodiments, a specific stream server or a specific cluster of server machines can be dedicated to processing just one type of stream data, for example, ad impressions, ad clicks, or conversions.

Ad impressions are ads that have been served on a webpage within the social networking site to a particular user who requested the webpage from the social networking service. In some embodiments, the data structure for each ad impression in the stream of ad impression data includes an ad id, a user id, a target id, and a time stamp. The ad id is a unique identification for the particular ad that is served. The user id is a unique identification for the particular user to whom the ad was served. The target id is a unique identification for the objective to be tracked for the ad. For example, the target id can be a product that is being promoted by an advertiser, such as a television. A target id can also be an identification for getting a user to like a specific webpage within the social networking site, or engaging with a webpage within the networking site, where engagement with the webpage is distinct from liking the webpage. The time stamp is the time when the ad was served to the user.

Ad clicks refer to clicks on an ad that has been served to a user within the social networking site. The data structure for each ad click in the stream of ad click data is the same as the data structure for an ad impression, that is, it includes an ad id, a user id, a target id, and a time stamp. The ad id is identification for the ad that the user clicked upon, and the user id is the identification for the user who clicked on the ad. The time stamp is the time when the user clicked on the ad.

Conversions refer to user actions, such as liking (or otherwise expressing a preferences for) a webpage, engaging with a webpage (e.g., posting a comment, sharing links, etc.), or purchasing a product of a partner vendor on a website external to the social networking site. The data structure for each conversion or user action in the stream of conversions includes a user id, a target id, and a time stamp. The user id is the identification for the user who performed the user action. The time stamp is when the user performed the user action. The target id is a unique identification for the identified objective of the user action and can have multiple fields. For example, if the user action type is a page like, then one of the fields can identify the webpage on which the page like occurred, and another field can identify a specific post on the webpage that was liked. These fields correspond to conversion specifications. Thus, each target id or conversion can match with multiple conversion specifications. For example, if the user action/conversion is that a user liked a webpage, the conversion specifications that can match this conversion are any action performed by the user on the page or any action that is performed on another post on the webpage. Described below is a logic used to narrow down the user action to the best matching conversion specification and corresponding unique conversion specification id.

Items in the conversion stream that are performed within the social networking system are sent to the stream server 210 from the access management system 150. Items in the conversion stream that are performed external to the social networking site, for example, purchase of a product from a partner's website, can be tracked by the partner and sent to the stream server 210. Tracking may be done via a tracking pixel which is a JavaScript code placed on the partner's website that makes a call to the stream server 210 when the user lands on the partner's website. Additionally, the user id associated with that user is obtained from user information stored within the social networking system.

From these streams of data 201, 202, 203, the stream server 210 and the attribution servers 220 can attribute an action taken by a user back to a specific ad that was delivered to the user that prompted the user to perform the action or that the user clicked on.

To perform the conversion attributions in near real-time, multiple attribution servers 220-1, 220-2, . . . 220-N are used in parallel. The streams of data 201, 202, 203 can either be distributed among or requested by the multiple attribution servers 220, as described below, so that the attribution servers 220 can work in parallel and operate independently of the rest of the attribution servers 220. Also, the system can scale with the addition of more attribution servers as the social networking system grows. Once the data from the streams 201, 202, 203 are distributed to or requested by each attribution server 220, they are stored in respective file systems 227-1, 227-2, . . . 227-N, and accessed in a respective local memory 225-1, 225-2, . . . 225-N when needed by the respective attribution server 220, wherein the memory 225 can be any type of memory, such as, random access memory, hard disk drive, and flash drive. In some embodiments, the file systems 227 are HDFS (Hadoop Distributed File System) that are designed to scale and reliably store very large data sets. However, any other system can be used to store the data as long as it scales. In some embodiments, the local memories 225 are implemented using a Log-Structured Merge-Tree (e.g., LevelDB, RocksDB) memory which provides an embeddable persistent key-value store for fast storage.

Conversion specifications are stored in a stream database 204. The structure of a conversion specification is an action type and a unique target objective. In some embodiments, the stream database 204 is accessed by the stream server 210, and a copy of the data in the stream database 204 is sent by the stream server 210 to each attribution server 220 or requested by the attribution servers 220 for local storage and use during conversion attribution. Updates to the stream database 204 can be sent to or requested by the attributions servers 220 as they occur. In some embodiments, the stream database 204 is directly accessible by each attribution server 220 for directly accessing the data to be stored locally.

Stream Server

Figure 2B:
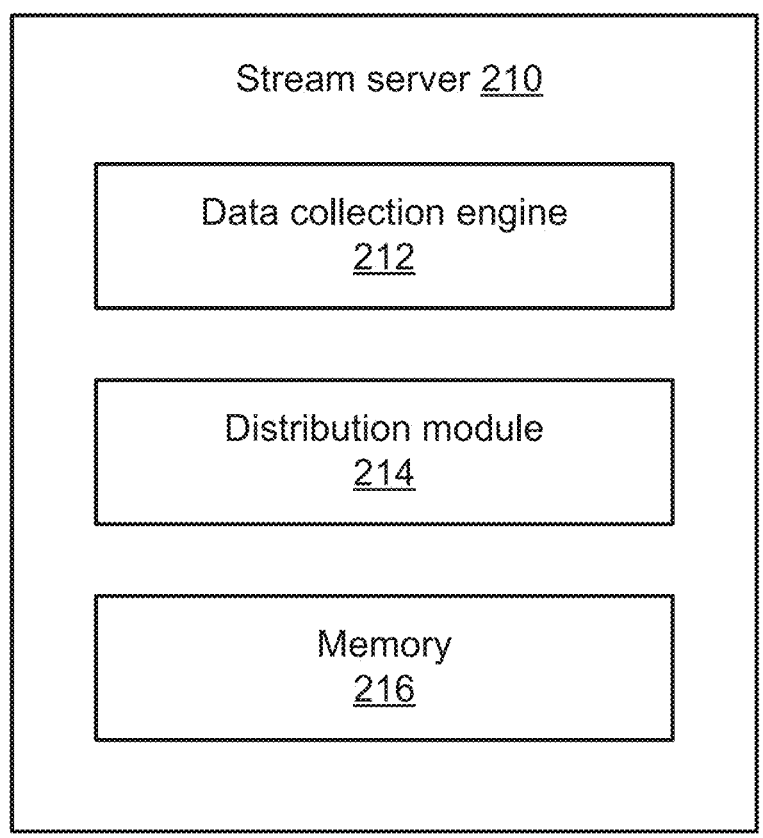
FIG. 2B depicts an exemplary architecture of a stream server according to an embodiment of the present disclosure.

FIG. 2B depicts an exemplary architecture of a stream server 210 according to an embodiment of the present disclosure. In the example of FIG. 2B, the stream server 210 (and all of the elements included within the stream server 210) is implemented by using programmable circuitry programmed by software and/or firmware, or by using special-purpose hardwired circuitry, or by using a combination of such embodiments. In some embodiments, the functions performed by the stream server 210 can be distributed among multiple stream servers, and each of the multiple stream servers can have an architecture similar to the example architecture shown in FIG. 2B.

In the example of FIG. 2B, the stream server 210 includes a data collection engine 212, a distribution module 214, and/or a memory 216. Additional or fewer components or modules can be included in the stream server 210 and each illustrated component.

As used herein, a "module" or "engine" includes a general purpose, dedicated or shared processor and, typically, firmware or software modules that are executed by the processor. Depending upon implementation-specific or other considerations, the module can be centralized or its functionality distributed. The module or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In some embodiments, the stream server 210 includes the data collection engine 212 configured to receive a stream of ad impressions, a stream of ad clicks, and a stream of conversions. In some embodiments, the data collection engine 212 is also configured to access the data stored in the stream database 204.

In some embodiments, the stream server 210 includes the distribution module 214 configured to implement a distribution sharding mechanism that virtually distributes the data received in the ad impression stream, the ad click stream, and the conversion stream among multiple virtual buckets, where the data in a certain number of buckets are then sent to each of the attribution servers performing attribution processing for the social networking systems. In one embodiment, the distribution is based upon user id of the data structures in the data streams. In this way, the workload of attribution processing can be distributed among the attribution servers.

In some embodiments, the stream server 210 includes the memory 216. Virtual buckets assigned to each attribution server can be stored in the memory 216. In some embodiments, the memory 216 is local to the stream server. In some embodiments, the memory 216 can be external to the stream server.

Figure 3:
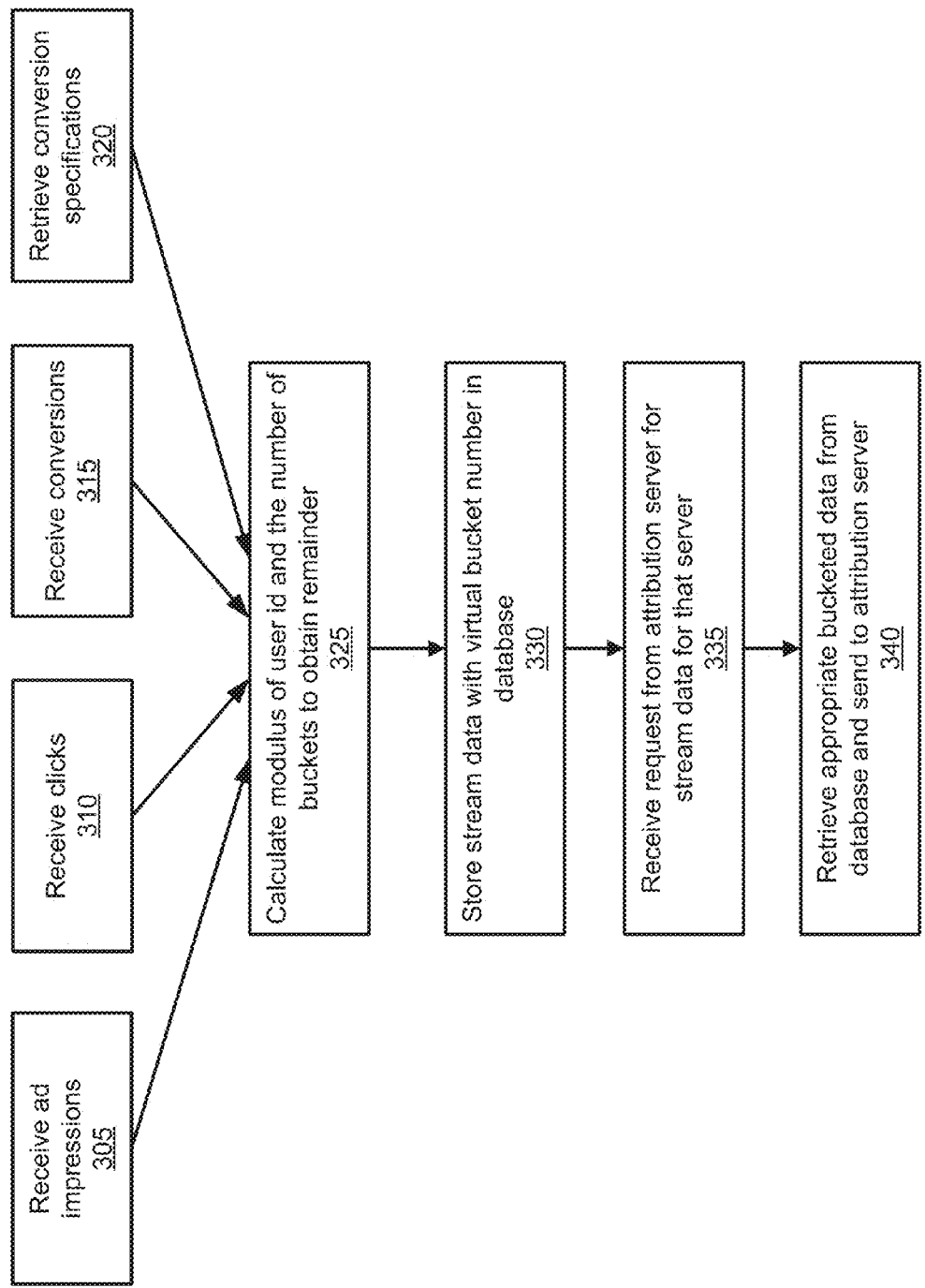
FIG. 3 is a flow diagram illustrating an example process performed by the stream server for receiving streams of data and distributing the data to attribution servers for attribution processing.

FIG. 3 is a flow diagram illustrating an example process performed by any of the stream servers in a stream server cluster for receiving streams of data and distributing the data to attribution servers for attribution processing. At block 305, the stream server receives a stream of ads that have been served, also referred to herein as ad impressions. At block 310, the stream server receives a stream of ad clicks, and at block 315, the stream server receives a stream of conversions. The streams of data can be interleaved among the stream servers in a stream server cluster, and each of the stream servers can operate independently of the other stream servers in receiving and processing the streams of data as described below.

At block 320, conversion specifications are retrieved by the stream server. The conversion specifications can be downloaded from the conversion specification database 224 by the stream server, or the conversion specifications can be sent to the stream server.

Next, at block 325, to sort the stream data, the stream server calculates the modulus of the user id for each piece of data received in each of the ad impressions stream, the ad click stream, and the conversions stream and the number of virtual buckets that the data is to be divided into. Using the remainder from the modulus operation performed on the user id is one method that can be used to sort ad impressions, ad clicks, and conversions associated with a user id value among several groups. For example, if the number of virtual buckets is 256, and the number of attribution servers is 64, then each attribution server would request and receive the data assigned to four pre-assigned virtual buckets. By distributing stream data according to user id, each attribution server can operate independently of all of the other attribution servers because a conversion has a particular user id associated with it, and the attribution server receiving that conversion will also receive all ad impressions and ad clicks associated with that particular user id. Thus, if user A buys a product, the purchase of the product by user A is a conversion, and the conversion will only be attributed to either user A clicking on an ad for the product or on the serving of an ad for the product to user A. So if the attribution server assigned to the user id for user A receives user A's conversions, then the information needed to attribute the conversion are user A's ad impression and ad clicks, if any.

Then, at block 330, the stream server stores the sorted stream data in a database, such as stream database 204, according to each piece of data's virtual bucket number.

At block 335, the stream server receives a request from one of the attribution servers for the stream data to be processed by that particular attribution server, where the stream data can include ad impression data, ad click data, and conversion data. The request can include the particular virtual bucket numbers that have been pre-assigned to the attribution server for processing. And at block 340, the stream server retrieves the appropriate bucketed data from the database and sends it to the attribution server. Additionally, the stream server can receive a request for and send any new conversion specifications stored in the stream database to the attribution server for performing conversion attributions.

Attribution Server

Figure 2C:
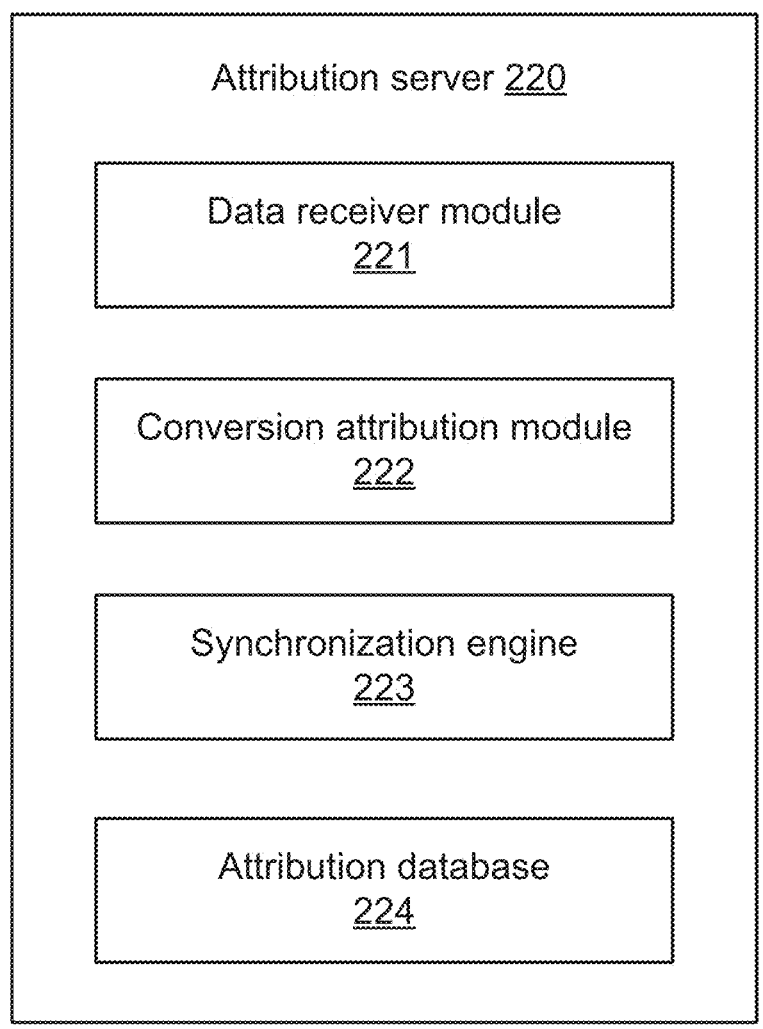
FIG. 2C depicts an exemplary architecture of an attribution server according to an embodiment of the present disclosure.

FIG. 2C depicts an exemplary architecture of an attribution server 220 according to an embodiment of the present disclosure. In the example of FIG. 2C, the attribution server 220 (and all of the elements included within the attribution server 220) is implemented by using programmable circuitry programmed by software and/or firmware, or by using special-purpose hardwired circuitry, or by using a combination of such embodiments.

In the example of FIG. 2C, the attribution server 220 includes a data receiver module 221, a conversion attribution module 222, a synchronization engine 223, and/or an attribution database 224. Additional or fewer components or modules can be included in the attribution server 220 and each illustrated component.

Figure 4:
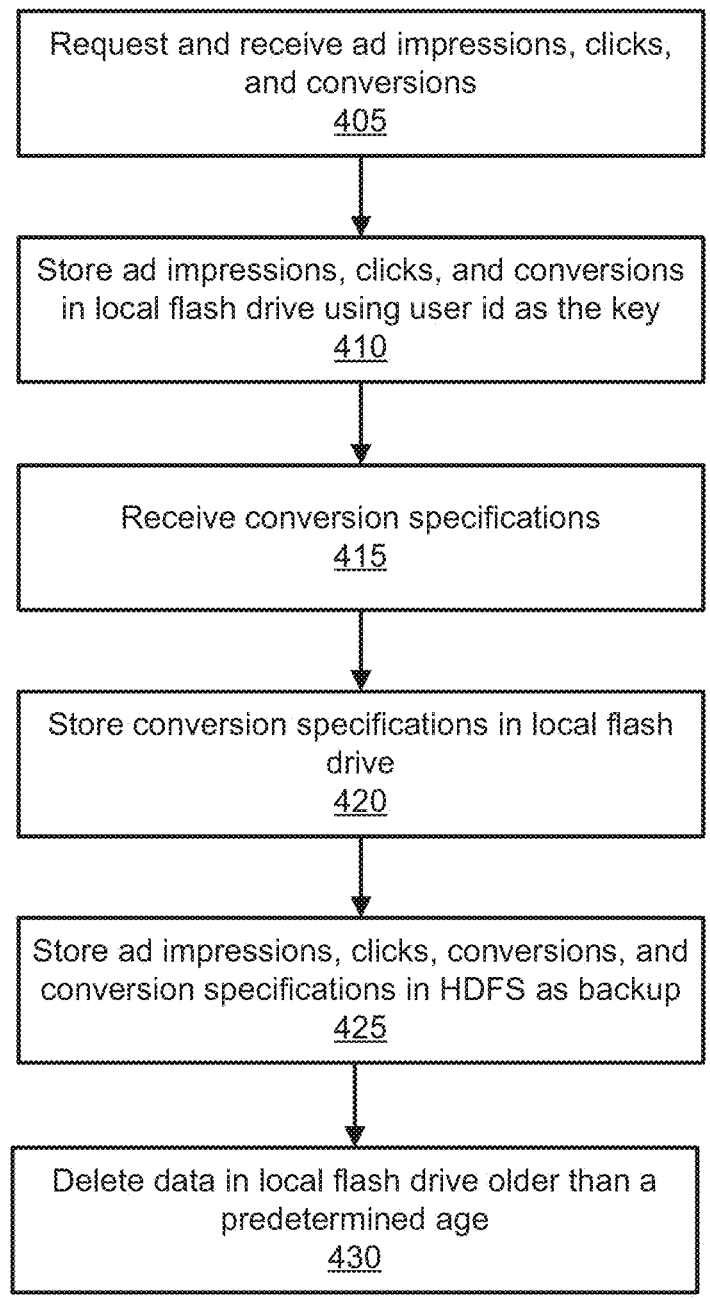
FIG. 4 is a flow diagram illustrating an example process performed by an attribution server for receiving and storing stream data for attribution processing.

In some embodiments, the attribution server 220 includes the data receiver module 221 which is configured to receive the data in the three streams, ad impressions, ad clicks, and conversions, store them in a local flash, and backup the data in an HDFS, or any other file system that is scalable. In the example of FIG. 4, a flow diagram illustrates an example process performed by an attribution server for receiving and storing stream data for attribution.

At block 405, the attribution server requests and receives the appropriate ad impressions, ad clicks, and conversions from the stream server that has been sorted into virtual buckets by the stream server(s) and pre-assigned to the attribution server. In other words, conversions, ad impressions, and ad clicks associated with certain predetermined user ids are processed by a specific assigned attribution server. Then at block 410, the attribution server stores the received ad impressions, ad clicks, and conversions in a memory, such as, random access memory, flash drives, and hard disk drives, using the user id as the key for the ad impressions, ad clicks, and conversions.

Next, at block 415, the attribution server receives the conversion specification information from the stream server, and stores the received conversion specifications in the local memory at block 420. In some embodiments, the local memory performs as a local cache to store the most recently accessed information by the attribution server.

At block 425, the received ad impressions, ad clicks, conversions, and conversion specifications are stored in the HDFS as backup. If the local memory should crash, another local memory can be installed that downloads the information in the HDFS. Then the data from the last 28 days, or however long data is stored in the HDFS before being deleted, does not need to be reprocessed At block 430, to save memory, the data stored in the local memory and the associated file system is deleted if the data is older than a predetermined age. For example, if the longest attribution window for attribution processing is 28 days, the data can be deleted on the 29th day.

Attribution Processing

Figure 5:
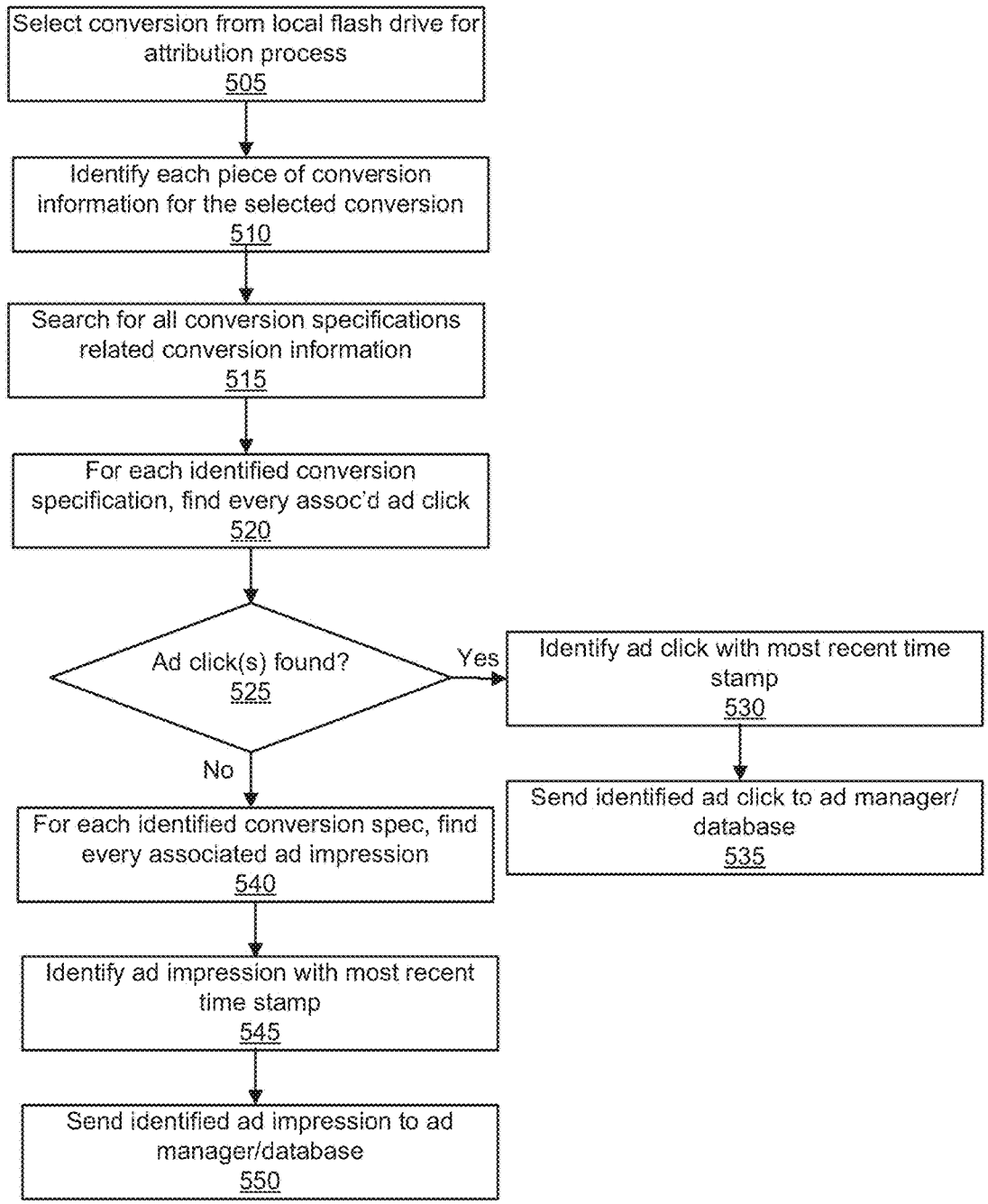
FIG. 5 is a flow diagram illustrating an example process performed by an attribution server for attributing a particular user ad click or ad impression to a user action.

In some embodiments, the attribution server 220 includes the conversion attribution module 222 configured to identify a particular ad click or ad impression that is correlated with a particular conversion. In the example of FIG. 5, a flow diagram illustrates an example process performed by an attribution server for attributing a conversion to a particular user ad click or ad impression.

At block 505, the attribution server selects a conversion from the local memory for the attribution determination process. The conversion was previously received in the conversion stream 201 from the stream server 210.

Then, at block 510, each piece of conversion information is identified for the selected conversion. For example, for a page like, the conversion information can be the id for the specific like page and a specific post that was liked on the webpage.

Next, at block 515, the attribution server searches in the local memory for all conversion specifications related to the identified conversion information. For the above page like example, related conversion specifications can include any action performed by the user on the webpage and any action performed by the user on another post on the webpage.

The search can be limited to a certain attribution window, for example, the past day (twenty-four hours), the past seven days, or the past 28 days, where an attribution window is the time period prior to the conversion during which the ad was served or the ad click was performed by a user. In some embodiments, data having a time stamp longer than a certain predetermined time window, e.g., 28 days, is deleted from the local memory and the associated file system to save memory space. At block 520, for each conversion specification related to the conversion, every associated ad click having the same target id is found in the local memory.

At decision block 525, the attribution server determines whether any associated ad clicks were found. If at least one associated ad click was found (block 525—Yes), at block 530, the attribution server identifies the ad click with the most recent time stamp. In some embodiments, for attribution purposes, the last time the user clicked on the ad is the one to which the conversion is attributed. So if a user clicked on the same ad five times, the last ad click is the one to which the conversion is attributed. Then at block 535, sends the identified ad click to the ad manager for the advertiser and/or stored in an attribution database 224. In some embodiments, every instance that the user clicked on the ad during the attribution window is identified, and all the identified ad clicks are sent to the ad manager and/or stored in the attribution database 224.

If no associated ad clicks are found (block 525—No), at block 540, the attribution server searches for every associated ad impression having the same target id as each identified conversion specification. Again, the search can be limited to a certain attribution window. Then at block 545, the ad impression with the most recent time stamp is selected. In some embodiments, for attribution purposes, the last time the ad was served to the user is the one to which the conversion is attributed. Then at block 550, the identified ad impression is sent to the ad manager for the advertiser and/or stored in the attribution database 224. In some embodiments, every instance that the ad was served to the user within the attribution window is identified, and all the identified ad impressions are sent to the ad manager and/or stored in the attribution database 224.

Stream Synchronization

In some embodiments, the attribution server 220 includes the synchronization engine 223 configured to synchronize the joining of the data streams. When the attribution servers 220 receive the streams of data 201, 202, 203 from the stream server, a first data record that is first in time in one of the data streams received at the stream server relative to a second data record in the same data stream is not necessarily presented in the same order to the attribution servers 220. Further, at times, the data for the ad impressions and/or ad clicks is delayed before it can be sent to the stream server. For example, when an ad is served on a webpage accessed by a user on a mobile device, because the user has to scroll the displayed screen on the mobile device to see the ad, and it takes time to present the ad to the user on the mobile device, the ad impression data sent back to the stream server may incur more delay than if the same ad were served to a user accessing the same webpage using a personal computer. So if the user action of engaging with the webpage qualifies as a conversion, the user action may be sent as data in the conversion stream before the ad impression is sent as data in the ad impression stream. In this case, the ad impression to which the conversion should be attributed is not available for attribution processing of the user action. In yet another scenario, the stream servers that log the stream data in the appropriate virtual buckets may perform the logging at different rates because, for example, some of the servers may be faster than other servers.

To increase the likelihood that a conversion can be successfully attributed to an ad click or an ad impression, the synchronization engine 223 continuously determines the distribution of delays for each of the streams for ad impressions, ad clicks, and conversions. The attribution processing is delayed an appropriate time interval if a first percentile of conversion delays is less than both a second percentile of ad impression delays and a third percentile of ad click delays. In some embodiments, processing of conversion attributions is delayed if the delay for the 5th percentile of conversions is less than both of the delays for the 95th percentile of ad impressions and the 95th percentile of ad clicks. By delaying attribution processing, the delayed ad impression and/or ad click data has a chance to catch up to the conversion data. Moreover, each attribution server synchronizes the streams of data it receives independently of the synchronization performed by the other attribution servers.

Figure 7A:
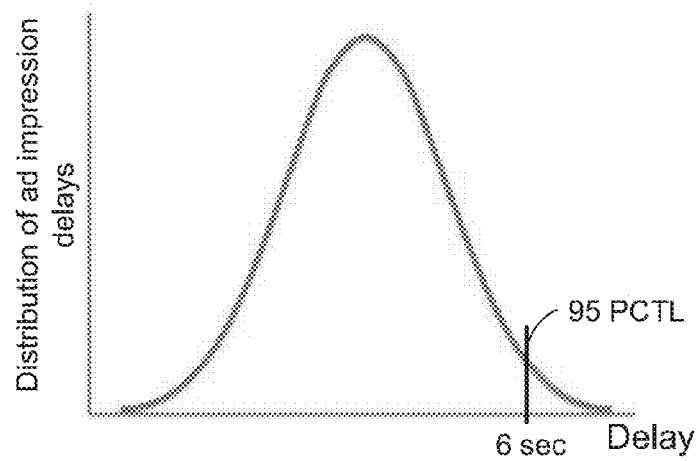
FIGS. 7A-7C depict example delay distributions for a stream of ad impressions, a stream of ad clicks, and a stream of conversions.
Figure 7B:
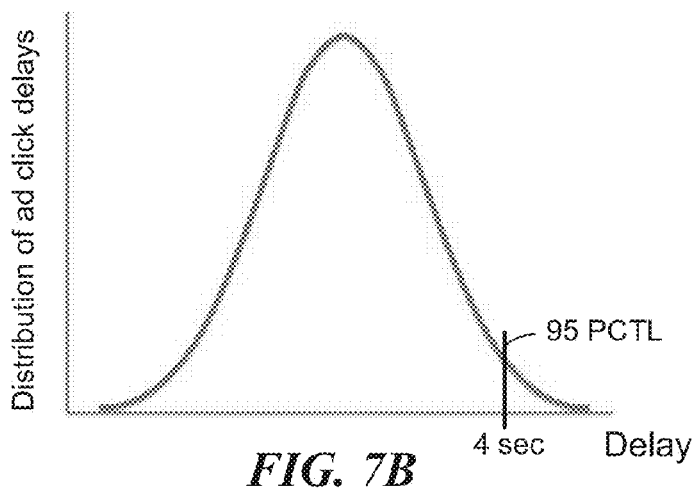
Figure 7C:
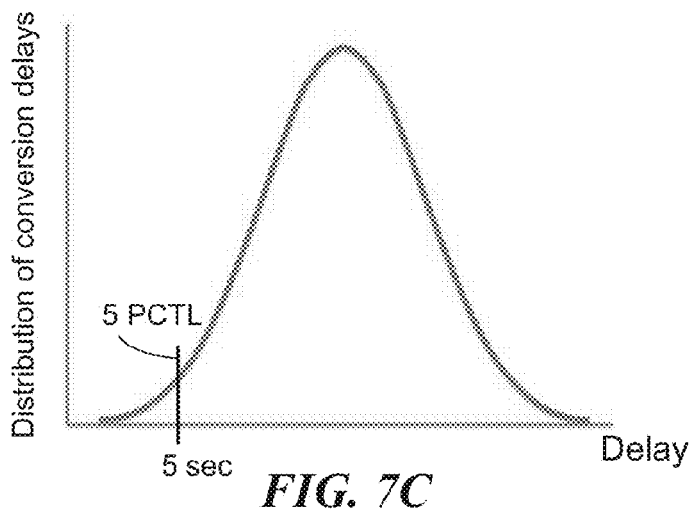

FIGS. 7A-7C depict example delay distributions for a stream of ad impressions, a stream of ad clicks, and a stream of conversions, respectively. For the example delay distribution for ad impressions shown in FIG. 7A, the 95th percentile of ad impression delays is 6 seconds. For the example delay distribution for ad clicks shown in FIG. 7B, the 95th percentile of ad click delays is 4 seconds. For the example delay distribution for conversions shown in FIG. 7C, the 5th percentile of conversion delays is 5 seconds.

Figure 6:
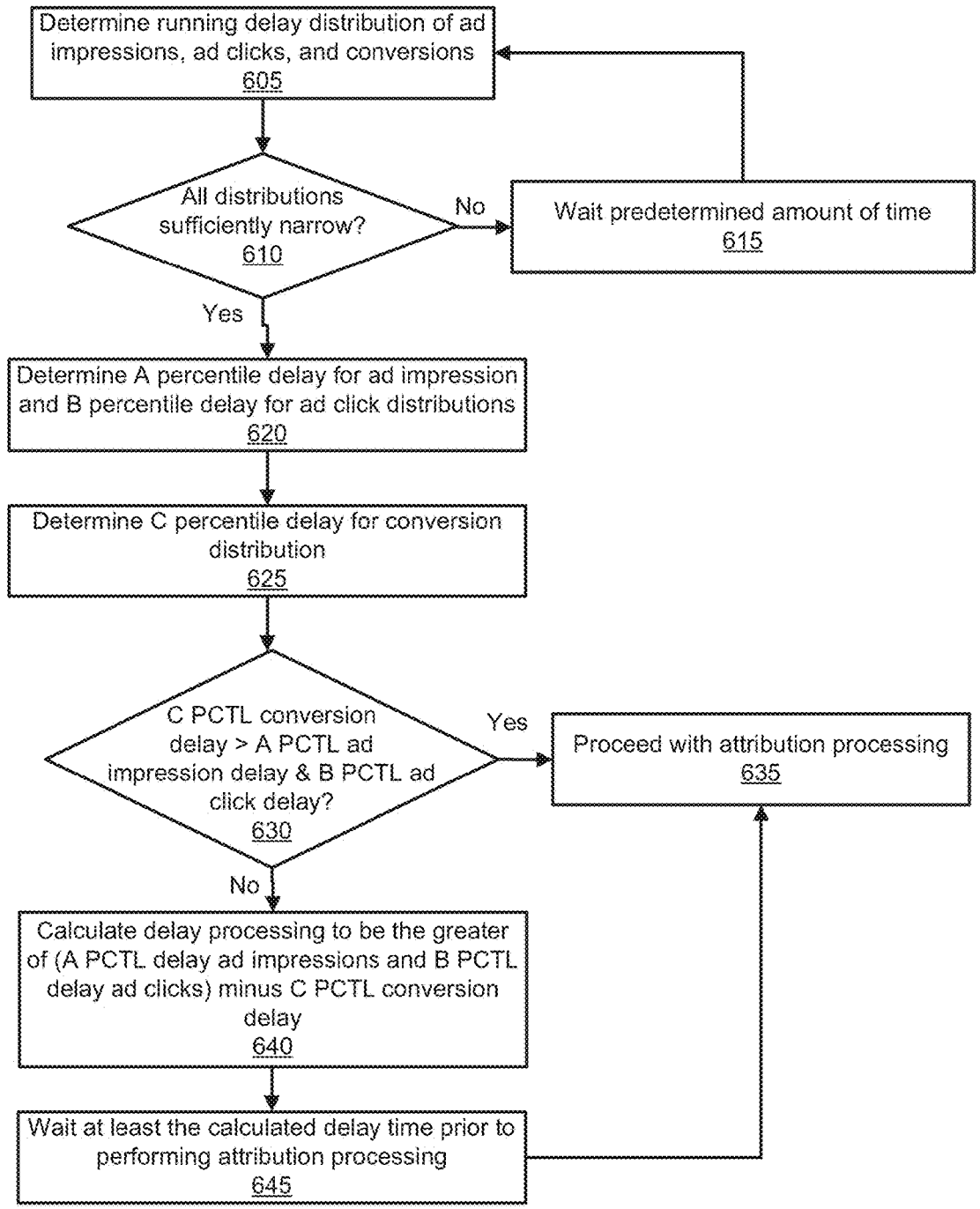
FIG. 6 is a flow diagram illustrating an example process performed by an attribution server for synchronizing data streams.

In the example of FIG. 6, a flow diagram illustrates an example process performed by an attribution server for synchronizing data streams. At block 605, the attribution server determines a running delay distribution of ad impressions, ad clicks, and conversions. The delay distribution is a running distribution as the distribution may change at any time, for example, due to changes in the network or in the social networking system.

At decision block 610, the attribution server determines whether each of the delay distributions for ad impressions, ad clicks, and conversions is sufficiently narrow. For example, the attribution server may calculate the full width at half max of the delay distribution to ensure that it is less than a predetermined target value. If the distributions are not sufficiently narrow (block 610—No), at block 615, the attribution server waits a predetermined amount of time, and the process returns to block 605.

If the distributions are sufficiently narrow (block 610—Yes), at block 620, the attribution server determines a first percentile delay of A, e.g., 95, for ad impressions and a second percentile delay of B, e.g., 95, for ad clicks. Then at block 625, the attribution server determines a third percentile delay of C, e.g., 5, for conversions. Next, at decision block 630, the attribution server determines whether the C percentile delay (5 PCTL) of conversions is greater than the A percentile (95 PCTL) delay of ad impressions and the B percentile (95 PCTL) delay of ad clicks. If the determination is positive (block 630—Yes), at block 635, the attribution server proceeds with attribution processing, as discussed above with respect to FIG. 5.

If the determination is negative (block 630—No), at block 640, the attribution server delays attribution processing at least the greater of the A percentile delay of ad impressions and the B percentile delay of ad clicks, minus the C percentile delay of conversions. Then at block 645, the attribution server waits for at least the calculated delay time, and at block 635, it proceeds with attribution processing.

For the example delay distributions for ad impressions, ad clicks, and conversions shown in FIGS. 7A-7C, the attribution server would determine at decision block 630 that the 5th percentile of conversion delays (5 seconds) is less than the 95th percentile of ad impressions (6 seconds) but greater than the 95th percentile of ad clicks (4 seconds). Thus, the result of decision block 630 is "no", and the process goes to block 640. At block 640, the delay time is calculated to be the greater of the 95th percentile of ad impression delays (6 seconds) and the 95th percentile of ad click delays (4 seconds), minus the 5th percentile of conversions (5 seconds), which results in a delay time of 6 seconds minus 5 seconds, which equals 1 second. Thus, at block 645, the attribution server waits at least 1 second before performing attribution processing, to wait for the slower stream of data to increase the likelihood that a conversion can be successfully correlated with the correct ad impression or ad click.

Social Networking System Architecture

As mentioned above, some embodiments can be utilized within a social networking system. Typically, a social networking system includes one or more computing devices storing user profiles associated with users and/or other objects as well as connections between users and other users and/or objects. In use, users join the social networking system and then add connections to other users or objects of the social networking system to which they desire to be connected. The users may be individuals or entities such as businesses, organizations, universities, manufacturers. The social networking system allows its users to interact with each other as well as with other objects maintained by the social networking system. In some embodiments, the social networking system allows users to interact with third-party websites and financial account providers.

Based on stored data about users, objects and connections between users and/or objects, the social networking system can generate and maintain a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system can modify edges connecting the various nodes to reflect the interactions.

Figure 8:
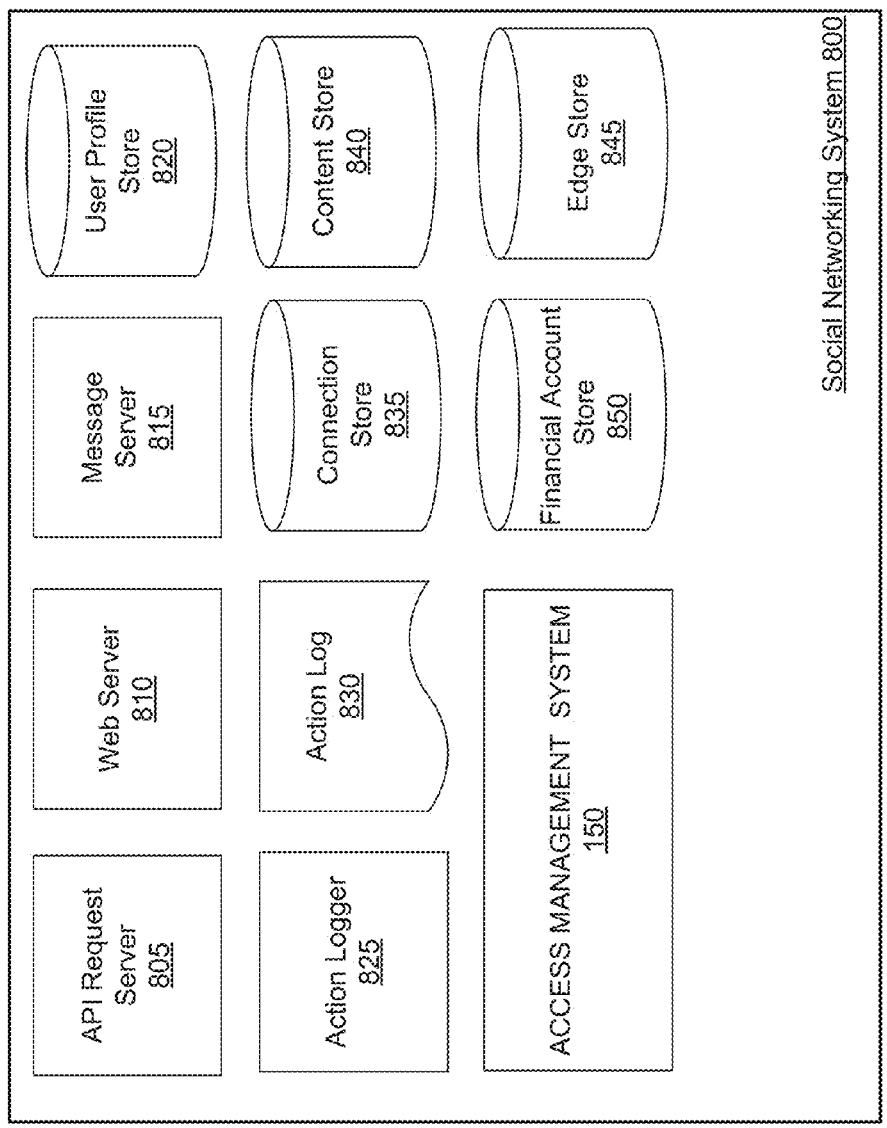
FIG. 8 is a block diagram of a system architecture of the social networking system with which some embodiments may be utilized.

FIG. 8 is a block diagram of a system architecture of the social networking system 800 with which some embodiments may be utilized. Social networking system 800 illustrated by FIG. 8 includes API (application programming interface) request server 805, web server 810, message server 815, user profile store 820, action logger 825, action log 830, connection store 835, content store 840, edge store 845, and financial account store 850. Information in the user profile store 820, content store 840, connection store 835, edge store 845, financial account store 850, and/or action log 830 can be stored in databases 185, 186, and the databases can be replicated in different regions. In other embodiments, social networking system 800 may include additional, fewer, or different modules for various applications. Conventional components such as network interfaces, security mechanisms, load balancers, failover servers, management and network operations consoles, and the like are not shown so as to not obscure the details of the system architecture.

API request server 805 allows other systems, user devices, or tools to access information from social networking system 800 by calling APIs. The information provided by the social network may include user profile information or the connection information of users as determined by their individual privacy settings. For example, a system, user device, or tools interested in accessing data connections within a social networking system may send an API request to social networking system 800 via a network. The API request is received at social networking system 800 by API request server 805. API request server 805 processes the request by submitting the access request to access management system 150 where access is determined and any data communicated back to the requesting system, user device, or tools via a network.

Web server 810 links social networking system 800 via a network to one or more client devices; the web server serves web pages, as well as other web-related content, such as Java, Flash, XML, and so forth. The web server 810 may communicate with the message server 815 that provides the functionality of receiving and routing messages between social networking system 800 and client devices. The messages processed by message server 815 can be instant messages, queued messages (e.g., email), text and SMS (short message service) messages, or any other suitable messaging technique. In some embodiments, a message sent by a user to another can be viewed by other users of social networking system 800, for example, by the connections of the user receiving the message. An example of a type of message that can be viewed by other users of the social networking system besides the recipient of the message is a wall post. In some embodiments, a user can send a private message to another user that can only be retrieved by the other user.

Each user of the social networking system 800 is associated with a user profile, which is stored in user profile store 820. A user profile includes declarative information about the user that was explicitly shared by the user, and may also include profile information inferred by social networking system 800. In some embodiments, a user profile includes multiple data fields, each data field describing one or more attributes of the corresponding user of social networking system 800. The user profile information stored in user profile store 820 describes the users of social networking system 800, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of social networking system 800 displayed in an image. A user profile in user profile store 820 may also maintain references to actions by the corresponding user performed on content items in content store 840 and stored in the edge store 845.

A user profile may be associated with one or more financial accounts, allowing the user profile to include data retrieved from or derived from a financial account. A user may specify one or more privacy settings, which are stored in the user profile, that limit information from a financial account that social networking system 800 is permitted to access. For example, a privacy setting limits social networking system 800 to accessing the transaction history of the financial account and not the current account balance. As another example, a privacy setting limits social networking system 800 to a subset of the transaction history of the financial account, allowing social networking system 800 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by social networking system 800. In some embodiments, information from the financial account is stored in user profile store 820. In other embodiments, it may be stored in financial account store 850.

Action logger 825 receives communications about user actions on and/or off social networking system 800, populating action log 830 with information about user actions. Such actions may include, for example, adding a connection to another user, sending a message to another user, uploading an image, reading a message from another user, viewing content associated with another user, attending an event posted by another user, among others. In some embodiments, action logger 825 receives, subject to one or more privacy settings, transaction information from a financial account associated with a user and identifies user actions from the transaction information. For example, action logger 825 retrieves vendor identifiers from the financial account's transaction history and identifies an object, such as a page, in social networking system 800 associated with the vendor identifier. This allows action logger 825 to identify a user's purchases of products or services that are associated with a page, or another object, in content store 840. In addition, a number of actions described in connection with other objects are directed at particular users, so these actions are associated with those users as well. These actions are stored in action log 830.

Action log 830 may be used by social networking system 800 to track user actions on social networking system 800, as well as external website that communicate information to social networking system 800. Users may interact with various objects on social networking system 800, including commenting on posts, sharing links, and checking-in to physical locations via a mobile device, accessing content items in a sequence or other interactions. Information describing these actions is stored in action log 830. Additional examples of interactions with objects on social networking system 800 included in action log 830 include commenting on a photo album, communications between users, becoming a fan of a musician, adding an event to a calendar, joining a groups, becoming a fan of a brand page, creating an event, authorizing an application, using an application and engaging in a transaction. Additionally, action log 830 records a user's interactions with advertisements on social networking system 800 as well as other applications operating on social networking system 800. In some embodiments, the action log 830 can send at least some of the data in the stream of ad clicks 203 or the stream of user actions/conversions 201 to the stream server 210. In some embodiments, data from action log 830 is used to infer interests or preferences of the user, augmenting the interests included in the user profile and allowing a more complete understanding of user preferences.

Action log 830 may also store user actions taken on external websites and/or determined from a financial account associated with the user. For example, an e-commerce website that primarily sells sporting equipment at bargain prices may recognize a user of social networking system 800 through social plug-ins that enable the e-commerce website to identify the user of social networking system 800. Because users of social networking system 800 are uniquely identifiable, e-commerce websites, such as this sporting equipment retailer, may use the information about these users as they visit their websites. Action log 830 records data about these users, including webpage viewing histories, advertisements that were engaged, purchases made, and other patterns from shopping and buying. Actions identified by action logger 825 from the transaction history of a financial account associated with the user allow action log 830 to record further information about additional types of user actions.

Content store 840 stores content items associated with a user profile, such as images, videos or audio files. Content items from content store 840 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of social networking system 800. Examples of social networking content items include suggested connections or suggestions to perform other actions, media provided to, or maintained by, social networking system 800 (e.g., pictures or videos), status messages or links posted by users to the social networking system, events, groups, pages (e.g., representing an organization or commercial entity), and any other content provided by, or accessible via, the social networking system.

Content store 840 also includes one or more pages associated with entities having user profiles in user profile store 820. An entity is a non-individual user of social networking system 800, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in content store 840, allowing social networking system users to more easily interact with the vendor via social networking system 800. A vendor identifier is associated with a vendor's page, allowing social networking system 800 to identify the vendor and/or to retrieve additional information about the vendor from user profile store 820, action log 830 or from any other suitable source using the vendor identifier. In some embodiments, the content store 840 may also store one or more targeting criteria associated with stored objects and identifying one or more characteristics of a user to which the object is eligible to be presented.

In some embodiments, edge store 845 stores the information describing connections between users and other objects on social networking system 800 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in social networking system 800, such as expressing interest in a page on the social networking system, sharing a link with other users of the social networking system, and commenting on posts made by other users of the social networking system. Edge store 845 stores edge objects that include information about the edge, such as affinity scores for objects, interests, and other users. Affinity scores may be computed by social networking system 800 over time to approximate a user's affinity for an object, interest, and other users in social networking system 800 based on the actions performed by the user. Multiple interactions between a user and a specific object may be stored in one edge object in edge store 845, in some embodiments. In some embodiments, connections between users may be stored in user profile store 820, or user profile store 820 may access edge store 845 to determine connections between users.

Figure 9:
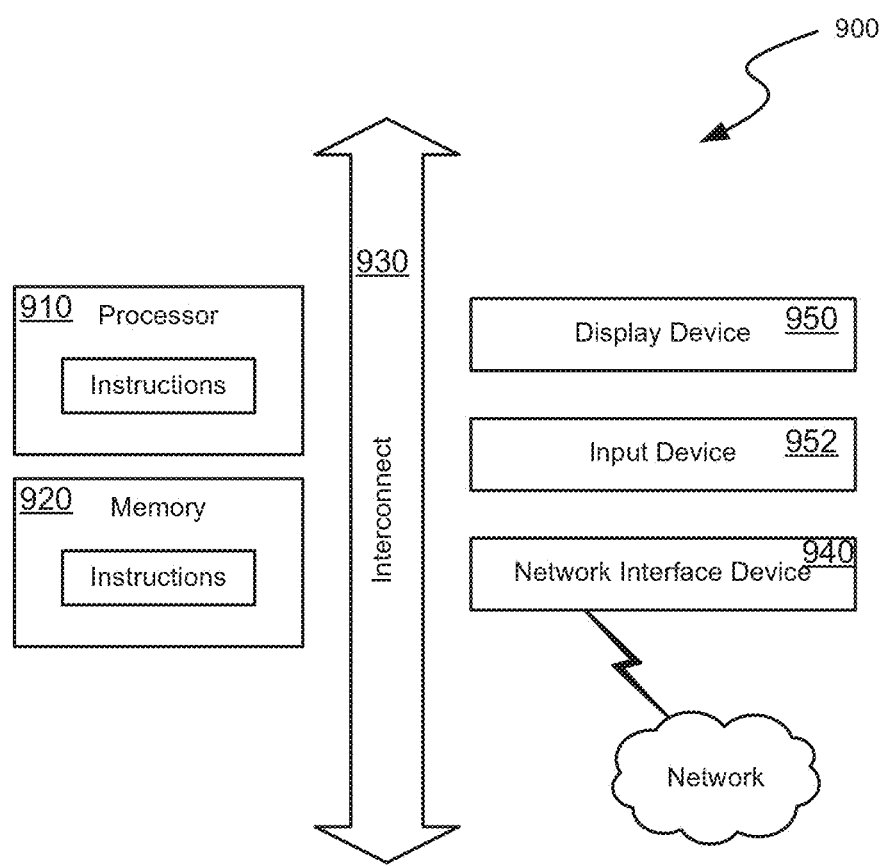
FIG. 9 is a block diagram showing an example of the architecture for a processing system that can be utilized to implement the conversion attribution techniques according to an embodiment of the present disclosure.

FIG. 9 is a block diagram showing an example of the architecture for a computer system 900 that can be utilized to implement the techniques described herein. The system 900 can reside in the stream server or the attribution server. In FIG. 9, the system 900 includes one or more processors 910 and memory 920 connected via an interconnect 930. The interconnect 930 is an abstraction that represents any one or more separate physical buses, point to point connections, or both connected by appropriate bridges, adapters, or controllers. The interconnect 930, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 910 can include central processing units (CPUs) that can execute software or firmware stored in memory 920. The processor(s) 910 may be, or may include, one or more programmable general-purpose or special-purpose microprocessors, digital signal processors (DSPs), programmable, application specific integrated circuits (ASICs), programmable logic devices (PLDs), or the like, or a combination of such devices.

The memory 920 represents any form of memory, such as random access memory (RAM), read-only memory (ROM), flash memory, or a combination of such devices. In use, the memory 920 can contain, among other things, a set of machine instructions which, when executed by processor 910, causes the processor 910 to perform operations to implement the embodiments.

Also connected to the processor(s) 910 through the interconnect 930 is a network interface device 940. The network interface device 940 provides the system 900 with the ability to communicate with remote devices, and may be, for example, an Ethernet adapter or Fiber Channel adapter.

The system 900 can also include one or more optional input devices 952 and/or optional display devices 950. Input devices 952 can include a keyboard, a mouse or other pointing device. The display device 950 can include a cathode ray tube (CRT), liquid crystal display (LCD), or some other applicable known or convenient display device.

Conclusion

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the embodiments is not intended to be exhaustive or to limit the embodiments to the precise form disclosed above. While specific examples for the embodiments are described above for illustrative purposes, various equivalent modifications are possible within the scope of the embodiments, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the embodiments.

Any patents and applications and other references noted above, including any that may be listed in accompanying filing papers, are incorporated herein by reference. Aspects of the embodiments can be modified, if necessary, to employ the systems, functions, and concepts included in such references to provide further implementations of the embodiments.

These and other changes can be made to the embodiments in light of the above Detailed Description. While the above description describes certain examples of the embodiments, and describes the best mode contemplated, no matter how detailed the above appears in text, the embodiments can be practiced in many ways. Details of the system may vary considerably in its specific implementation, while still being encompassed by the embodiments disclosed herein. As noted above, particular terminology used when describing certain features or aspects of the embodiments should not be taken to imply that the terminology is being redefined herein to be restricted to any specific characteristics, features, or aspects of the embodiments with which that terminology is associated. In general, the terms used in the following claims should not be construed to limit the embodiments to the specific examples disclosed in the specification, unless the above Detailed Description section explicitly defines such terms. Accordingly, the actual scope of the embodiments encompass not only the disclosed examples, but also all equivalent ways of practicing or implementing the embodiments under the claims.

While certain aspects of the embodiments are presented below in certain claim forms, the applicant contemplates the various aspects of the embodiments in any number of claim forms. For example, while only one aspect of the embodiments are recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the embodiments.

We claim:

1. A system, comprising:
   a stream server configured to:
      receive a first stream of first data and a second stream of second data, wherein a first data structure of the first data and a second data structure of the second data share a common key, wherein the first data structure and the second data structure each include a time stamp, and
      distribute portions of the first stream and the second stream to a plurality of merging servers based upon a value of the common key; and
   the plurality of merging servers, wherein each of the plurality of merging servers is configured to:
      receive a different set of first data and a different set of second data, and wherein a specified merging server of the plurality of merging servers receives all of the first data and the second data that share the common key of a specified value,
      determine a delay distribution of the received first data and second data,
      determine a processing delay based upon the delay distribution of the first data and the delay distribution of the second data,
      after the processing delay, from the received first data and second data, correlate specific ones of the received second data with specific ones of the received first data to generate attributions of the first data to the second data,
      store the attributions in a storage system, and
      operate independently of the other merging servers.

2. The system of claim 1, further comprising:
   a plurality of local drives, wherein each of the plurality of merging servers uses one of the plurality of local drives as a cache for storing the received first data and second data.

3. The system of claim 2, further comprising:
   a plurality of file systems, wherein each of the plurality of local drives backs up the stored first data and second data to one of the plurality of file systems.

4. The system of claim 2,
wherein the stream server is further configured to receive a third stream of third data, wherein a third data structure of the third data shares the common key with the first data structure and the second data structure, and
wherein the stream server is further configured to distribute portions of the third stream to the plurality of merging servers based upon the value of the common key, and further
wherein each of the plurality of merging servers is configured to correlate specific ones of the third data with specific ones of the first data,
wherein the first data are user actions, the second data are ad impressions, and the third data are ad clicks, wherein an ad impression is an ad that has been served to a user, and further wherein the ad click is an ad that has been served to a user that the user has clicked upon.

5. The system of claim 4, further comprising:
a database configured to store conversion specifications, wherein the stored conversion specifications are copied to the plurality of local drives, and further wherein each user action can correspond to one or more conversion specifications that are used to correlate specific ones of the second data and specific ones of the third data with specific ones of the first data.

6. The system of claim 4, wherein the common key is a user id.

7. The system of claim 1, wherein distributing portions of the first stream and second stream based upon the value of the common key comprises:
calculating a remainder of the value of the common key for each first data divided by a given multiple of a number of the plurality of merging servers;
calculating a remainder of the value of the common key for each second data divided by the given multiple of the number of the plurality of merging servers; and
distributing the first data and the second data to each of the plurality of merging servers based on the remainder, wherein each of the plurality of merging servers is assigned the first data and the second data having a remainder in a particular range.

8. The system of claim 1, wherein determining a processing delay comprises:
determining a first delay corresponding to a first percentile of delays of the first data;
determining a second delay corresponding to a second percentile of delays of the second data; and
if the first delay is less than the second delay, determining the processing delay to be at least a difference between the second delay and the first delay; and
if the first delay is greater than or equal to the second delay, determining the processing delay to have no minimum value.

9. A computer-implemented method comprising:
receiving a first stream of first data and a second stream of second data, wherein the first data and the second data include a common field; and
distributing parts of the first stream and the second stream to a plurality of servers based upon a value of the common field;
receiving, by each of the plurality of servers, a different set of first data and a different set of second data, and wherein a specified server of the plurality of servers receives all of the first data and the second data that share the common field of a specified value;
determining a delay distribution of the received first data and second data;
determining a processing delay based upon the delay distribution of the first data and the delay distribution of the second data;
determining, after the processing delay and by each of the plurality of servers, whether specific ones of the first data are to be associated with specific ones of the second data to generate attributions of the first data to the second data; and
storing, by each of the plurality of servers, the attributions in a storage system, and further wherein each of the plurality of servers operates independently of the other servers.

10. The computer-implemented method of claim 9, wherein distributing parts of the first stream and the second stream to a plurality of servers based upon a value of the common field comprises:
performing the modulus operation on a value of the common key for each first data and a number of groups into which the first data is to be divided;
performing the modulus operation on a value of the common key for each second data and the number of groups into which the second data is to be divided;
sending the first data and the second data to each of the plurality of servers based on a remainder of the modulus operation, wherein each of the plurality of servers is associated with a specific non-overlapping range of remainders.

11. The computer-implemented method of claim 9, further comprising:
receiving a third stream of third data, wherein the third data includes the common field; and
distributing parts of the third stream to the plurality of servers based upon the value of the common field;
wherein the plurality of servers determine whether specific ones of the first data are to be associated with specific ones of the third data.

12. The computer-implemented method of claim 11, wherein first data are conversions, the second data are ad clicks, and the third data are ad impressions.

13. The computer-implemented method of claim 12, wherein the common field is a user id.

14. A non-transitory computer-readable storage medium storing computer-readable instructions, comprising:
instructions for receiving a first stream of first data and a second stream of second data, wherein the first data and the second data include a common field;
instructions for distributing parts of the first stream and the second stream to a plurality of servers based upon a value of the common field;
instructions for receiving, by each of the plurality of servers, a different set of first data and a different set of second data, and wherein a specified server of the plurality of servers receives all of the first data and the second data that share the common field of a specified value;
instructions for calculating a delay distribution of the first data and second data;
instructions for determining a processing delay based upon the delay distribution of the first data and the delay distribution of the second data, wherein a data structure associated with the first data and a data structure associated with the second data each include a time stamp;
instructions for determining, after the processing delay and by each of the plurality of servers, whether specific ones of the first data are to be associated with specific ones of the second data to generate attributions of the first data to the second data; and instructions for storing, by each of the plurality of servers, the attributions in a storage system, and further wherein each of the plurality of servers operates independently of the other servers.

15. The computer-readable storage medium of claim 14, wherein the instructions for distributing parts of the first stream and the second stream include:

instructions for performing the modulus operation on a value of the common key for each first data and a number of groups into which the first data is to be divided;

instructions for performing the modulus operation on a value of the common key for each second data and the number of groups into which the second data is to be divided;

instructions for sending the first data and the second data to each of the plurality of servers based on a remainder of the modulus operation, wherein each of the plurality of servers is associated with a specific non-overlapping range of remainders.

16. The computer-readable storage medium of claim 14 further comprising:

instructions for storing, by each of the plurality of servers, the received first data and second data in one of a plurality of local drives associated with the corresponding server.

17. The computer-readable storage medium of claim 16 further comprising:

instructions for backing up, by each of the plurality of local drives, the first data and the second data to one of a plurality of file systems.

* * * * *